United States Patent
Nishide et al.

(10) Patent No.: US 7,426,060 B2
(45) Date of Patent: Sep. 16, 2008

(54) IMAGE PROCESSING METHOD, IMAGE PROCESSING DEVICE AND IMAGE PROCESSING SYSTEM

(75) Inventors: Yasushi Nishide, Ebina (JP); Ryuichi Ishizuka, Ebina (JP); Mari Kodama, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 858 days.

(21) Appl. No.: 10/390,718

(22) Filed: Mar. 19, 2003

(65) Prior Publication Data

US 2004/0051887 A1 Mar. 18, 2004

(30) Foreign Application Priority Data

Mar. 19, 2002 (JP) ............................... 2002-076856

(51) Int. Cl.
*H04N 1/60* (2006.01)
*G06K 9/00* (2006.01)
(52) U.S. Cl. .................. 358/1.9; 358/518; 358/523; 382/162; 382/167
(58) Field of Classification Search ................ 358/1.15, 358/2.1, 1.9, 1.13, 504, 527, 529, 518, 534–537, 358/523; 347/15, 43, 115, 120; 382/100, 382/162, 166–167
See application file for complete search history.

(56) References Cited

U.S. PATENT DOCUMENTS 5,579,446 A * 11/1996 Naik et al. .................. 358/1.9
5,923,774 A * 7/1999 Ostromoukhov ............ 382/162
6,717,699 B1 * 4/2004 Janssen et al. .............. 358/2.1
2002/0051176 A1 * 5/2002 Kato ......................... 358/1.15
2002/0054352 A1 * 5/2002 Shibasaki ................... 358/2.1
2002/0097294 A1 * 7/2002 Shibata et al. ................ 347/43

FOREIGN PATENT DOCUMENTS

JP   A 11-069173   3/1999
JP   A 2000-62253   2/2000

OTHER PUBLICATIONS

Etsuro Endo, Adove Photoshop A to Z, BNN Inc., Feb. 15, 1993, 1st edition, P. 163 (with translation).

* cited by examiner

*Primary Examiner*—David k Moore
*Assistant Examiner*—Charlotte M Baker
(74) *Attorney, Agent, or Firm*—Oliff & Berridge, PLC (57) ABSTRACT

An image processing method and image processing device which carry out color replacement of any color of process colors, by using another process color or a spot color which is not a process color. CMYK values of raster data of a color for which color replacement is designated, among process colors of an image object, are converted by using CMYK values of a replacement color stored in advance, and raster data of the replacement color is generated. Then, this raster data is composed with raster data of a remaining color which is not subjected to color replacement, or raster data of another color replaced in. At this time, color correction is carried out on raster data of remaining process colors.

8 Claims, 10 Drawing Sheets

```
...
%%Page: 1 1
%%BeginPageSetup
%RBIIncludePageSlotInvocation
mTSsetup
pmSVsetup
initializepage
(; PAGE  : 1 / 2)setjob
%%EndPageSetup
gS 0 0 572 819 rC
1 G
0 0 0 0 rF
0 0 :M
%%QRKSequentialPageRange: 1 1
%%QRKPageBegin: 1
%%QRKSequentialPage: 1
%%PlateColor: Cyan
QuarkXPress_4.1 begin
...
```

IMAGE PROCESSING METHOD, IMAGE PROCESSING DEVICE AND IMAGE PROCESSING SYSTEM

BACKGROUND OF THE INVENTION

1. Field of the Invention

The present invention relates to an image processing method and an image processing device for outputting image data to an image output device which records an image on a recording paper, on the basis of image data for multi-color printing.

2. Description of the Related Art

DTP (desktop publishing) has come to be widely used as a way of digitizing in the field of printing processing. In DTP, at a processing device such as a personal computer or a work station or the like, a page layout is prepared by carrying out creation, manipulation, editing, and the like of an image. On the basis of this page layout, preparation of a film for exposing a printing plate is carried out (CEPS), or a press plate for printing is prepared by directly writing the image onto a printing plate (CTP: computer-to-plate).

When proofing and the like are carried out before printing using an actual press plate, a page layout displayed on a monitor is printed by a print-out device such as a page printer or the like by using the WYSIWG function or the like of a processing device.

Usual color printing is carried out by using the four colors (process colors) of cyan, magenta, yellow and black. However, there are cases in which inks of colors different from the process colors (such colors are hereinafter called "spot colors") are used as needed.

In recent years, in order to keep printing costs down, there are cases in which two-color printing is carried out. At this time, special effects can be achieved by using one process color and a spot color, or by using two spot colors.

Even if an attempt is made to use a spot color at the time of preparing, on a client computer, output data for two-color printing, it is usually the case that, in ordinary applications for DTP (i.e., in software for specific purposes, and devices which store and implement such software), mixing of a spot color and a spot color, or mixing of a spot color and a process color cannot be designated. Thus, data for two-color printing is usually film—outputted by using two process colors.

If process colors are used, mixing of the colors can be easily designated. However, when outputting to an ordinary image processing device, only output which is in the process colors can be obtained. Thus, it is difficult to clearly confirm the finish of the actual printed matter.

In order to overcome this problem, in the client computer, a method is used which utilizes an application for conversion, and which separately generates and prints-out data for output confirmation.

In this method, for example, a pattern of a region in which color data is defined is extracted from document data prepared by using a DTP application. By rewriting this color data, a document of two process colors is converted into colors which are close to two colors using spot colors. In this way, color comprehensive layout output, which is as if spot colors were used, can be obtained even from document data prepared by using two process colors.

However, using a conversion application at the client computer entails preparing another data for color comprehensive layout output, and the data management becomes complicated. Further, when the data prepared by the application is converted, overprinting and trapping information of the original data is lost. Thus, simulations of overprinting and trapping and the like cannot be carried out.

To address this problem, Japanese Patent Application Laid-Open (JP-A) No. 2000-62253 discloses a method for applying a special profile for two-color printing to a CMYK color management function.

In this method, first, predetermined spot color inks used in two-color printing are used, and a color chart is printed by actually using a press plate. By measuring this color chart, a profile for the spot color (a CMYK-$L^*a^*b^*$ look-up table) is prepared. Then, simulation of spot color printing is carried out by realizing CMYK-C'M'Y'K' conversion using the color management function, by using the profile for the spot color and a profile for the printer (an $L^*a^*b^*$-C'M'Y'K' look-up table).

However, in this method, the color chart obtained by combining the two colors which are used must be printed by using the actual spot color inks. This chart must be subjected to color measurement, and a profile must be prepared. The work for preparing the profile must be carried out each time the color which is used is changed. A problem arises in that, in the initial proofreading printing, if the finish is different from the envisaged finish or if changing of the spot color is desired, much work, time and cost is required in preparing a new profile.

Namely, in the method disclosed in JP-A No. 2000-62253, when the combination of colors which are used is changed, work, time and costs, which are equivalent to or greater than those in a case in which a flat-bed proof printing press or the like is used, are required in order to obtain a proof print.

SUMMARY OF THE INVENTION

The present invention has been conceived of in light of the above-described circumstances, and an object of the present invention is to provide an image processing method and an image processing device which can carry out simulation of two-color printing and the like using spot colors, easily and at a low cost, from printing data for press plate printing such as document data or image data or the like in which two process colors are used.

In order to achieve the above object, an aspect of the present invention is an image processing method in which data of an image expressed by process colors is received and the image data is processed, said image processing method comprising the steps of: storing color information of a replacement color, which replacement color is set in advance to replace at least one process color within the image; and replacing, within the image data, color information of the at least one process color for which replacement is designated with stored color information of the replacement color when color replacement and a replacement color are designated for the at least one process color within the image, thereby generating new color information.

The image data is generally sent from an image processing terminal connected via a network. The image data may include data called drawing data.

In accordance with this aspect of the present invention, when there is a setting to replace any of process colors among the four process colors of CMYK forming a color image, with a color other than a process color or with another process color that is different from that process color, the color information of that color is replaced with color information of a replacement color stored in the storing means or color information of a set process color.

Namely, by replacing any of CMYK with the color information (CMYK values) of the replacement color, CMYK values, which are color information per pixel of the image data or drawing data, are composed.

Because only the color information is replaced in this way, the respective types of information of the original image data or drawing data are not adversely affected. Further, when image processing is carried out in accordance with a processing request from an image processing terminal, in order to carry out color replacement, the data management at the image processing terminal does not become complex.

In such an image processing method of the above-described aspect of the present invention like this, when color replacement and replacement colors are respectively designated for the plurality of process colors in the image data or drawing data, the color information of those process colors in the image data or drawing data are replaced with the color information of the replacement colors that are stored in advance, and the color information of the replacement colors that are replaced in is composed, thereby generating new color information.

Further, in accordance with the image processing method of the above-described aspect of the present invention, the color information of the replacement color that is replaced in is composed with color information of another process color in the image data or drawing data, thereby generating new color information.

Thus, the two-color printing or three-color printing using a plurality of spot colors or process colors can be achieved as well as mono-color printing of a color which is designated for the spot color.

In accordance with the image processing method of the above-described aspect of the present invention, color correction for the other process color other than the process color for which color replacement is designated, can be carried out before the color information of the replacement color is composed. Thus, even when printing simulation is carried out, print-out of an appropriate color is possible.

Another aspect of the present invention is an image processing device receiving data of an image expressed by process colors, and processing the image data, said image processing device comprising: storing means for storing color information of a replacement color, which replacement color is set in advance to replace at least one process color within the image; replacing means for reading-out from the storing means the color information of the replacement color for the at least one process color, within the image, for which color replacement has been designated, and for replacing the color information of the at least one process color with the color information of the replacement color read-out from the storing means, within the received image data; and generating means for generating new color information based on the color information of the replacement color which is replaced in by the replacing means. The image data may generally include what is called drawing data.

The image processing device generates new color information by composing color information of a plurality of replacement colors, with which a plurality of process colors have been respectively replaced, when color replacement and replacement colors are designated for the plurality of process colors.

The generating means may compose the color information of the replacement color and color information of another process color, within the image, other than the process color for which color replacement is designated, thereby generating new color information.

The image processing device may further comprise color correcting means for carrying out color correction of color information of another process color. In this case, the generating means composes the color information of the another process color subjected to color correction and the color information of the replacement color.

Moreover, the image processing device may comprise a storing section having: a region for output which stores the color information of the replacement color; and a region for color correction which stores the color information of the another process color, wherein the color correcting means carries out color correction on the color information stored in the region for color correction, and the generating means may compose the color information stored in the region for output and the corrected color information.

The generating means may generate raster data for each process color from the received image data, generate raster data of the replacement color on the basis of color information of the raster data of the process color for which color replacement has been designated and on the basis of color information of the replacement color, and composes the generated raster data of the replacement color with the raster data on the basis of color information of another process color.

Yet another aspect of the present invention is an image processing system comprising: an image processing terminal providing image data which express an image including process colors; and an image processing device receiving the image data and processing the image data, the image processing device having storing means for storing color information of a replacement color, which replacement color is set in advance to replace at least one process color within the image; replacing means for reading-out from the storing means the color information of the replacement color for the at least one process color, within the image, for which color replacement has been designated, and for replacing the color information of the at least one process color with the color information of the replacement color read-out from the storing means, within the received image data; and generating means for generating new color information based on the color information of the replacement color which is replaced in by the replacing means.

The image processing terminal may have setting means for setting, from among process colors within the image, at least one color for which color replacement is to be carried out, and a replacement color with which the color is to be replaced, which replacement color is stored in the storing means.

In the above-described image processing device and image processing system, a image processing means is provided and the image processing means carries out image processing in accordance with the image data or the drawing data. At this time, when there is a color for which color replacement is designated, the replacing means reads the color information of the replacement color stored in the storing means and uses it to replace the color information of the color for which color replacement has been designated.

Thereafter, the generating means generates new color information on the basis of the color information of the replacement color that is replaced in, whereby color replacement is carried out without the various types of settings for the image data or the drawing data being adversely affected.

At this time, in the image processing device of the present invention, the generating means may be structured such that, when color replacement is set for the plurality of process colors in the image data or drawing data and when the replacing means read out from the storing means the color information of the replacement colors for the respective process colors to be replaced and replaces color information of the respective process colors with that of the replacement colors, the generating means may compose respective color information of the replacement colors that are replaced in.

In the image processing system of the above-described aspect, the image processing means may include setting means for setting, by selection or input and from the process colors of the image data or the drawing data, a color for which color replacement is to be carried out and a replacement color whose color information is stored in the storing means.

In this way, the settings for color replacement can be carried out easily from the image processing terminal, and the data management at the image processing terminal can be prevented from becoming complex.

Further, the image processing device and image processing system of the above-described aspects include color correcting means for carrying out color correction on the process color of the image data or the drawing data. After the color correcting means has carried out color correction on another process color in the image data or drawing data, the generating means composes the color information of the replacement color which has been replaced in by the replacing means.

In this way, the color reproducibility can be improved, and even when printing simulation is carried out, an appropriate print-out can be obtained. Note that, when the replacement color is a process color, the color correction may be carried out together with process colors for which replacement is not designated.

Moreover, in the image processing device and image processing system of the above-described aspects, the image processing section may be provided with a storing section having a region for output which stores color information of the replacement color, and a region for color correction which stores the color information of the other process color in the image data or the drawing data. Color correction on the color information stored in the region for color correction can be carried out by the color correcting means, and the color-corrected information may be composed with the color information stored in the region for output. Moreover, the image processing device may be structured such that, when raster data per process color is generated at the image processing section, raster data is generated on the basis of the raster data of the process color for which color replacement has been designated, and on the basis of color information of the replacement color, and this raster data is composed with the raster data of the other process color.

In this way, color replacement and color correction can be carried out before preparation of the raster data, and a color image can be formed on, for example, a recording paper or the like.

BRIEF DESCRIPTION OF THE DRAWINGS

FIGS. 8A and 8B are schematic structural diagrams showing a flow of processing for separation output.

DETAILED DESCRIPTION OF THE INVENTION

Figure 1:
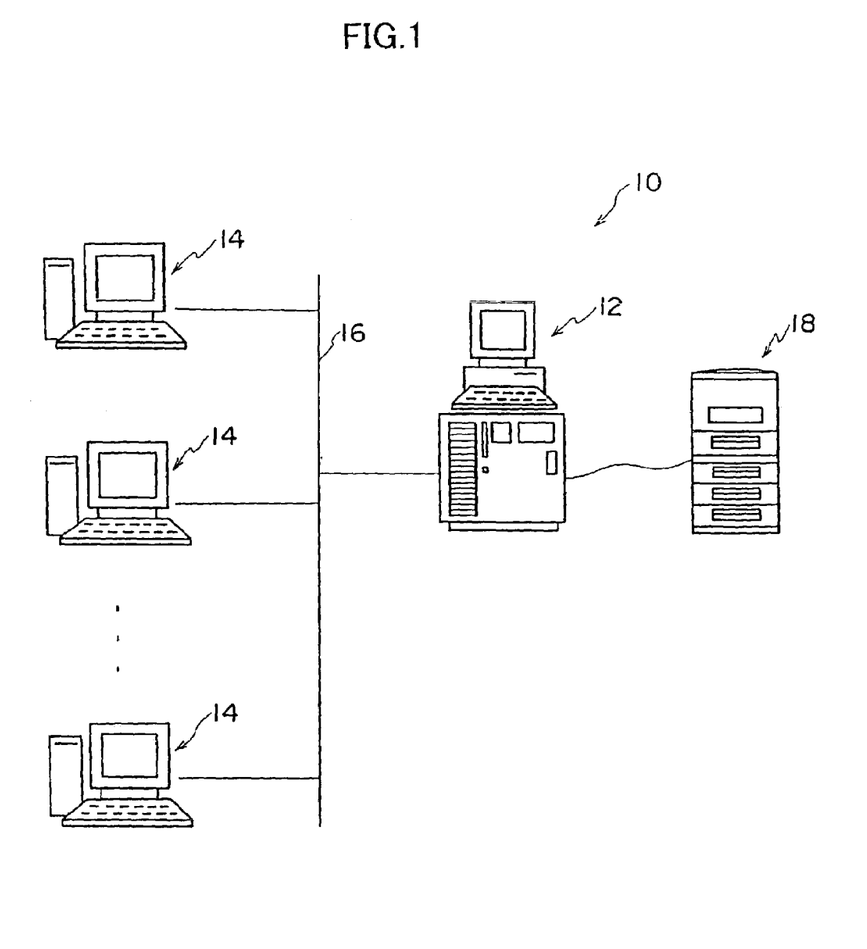
FIG. 1 is a schematic structural diagram of a network applied to an embodiment of the present invention.

Hereinafter, embodiments of the present invention will be described with reference to the drawings. FIG. 1 shows the schematic structure of a network 10 applied to the present embodiment. In the network 10, a print server 12, which is provided as the image processing device to which the present invention is applied, and a plurality of client terminals 14, which are provided as image processing terminals, are connected as a network via a communication line 16.

A printer 18 serving as a print-out device is connected to the print server 12. When the print server 12 receives a print job outputted from the client terminal 14, the printer 18 carries out printing output corresponding to the print job.

Hereinafter, explanation will be given of a case in which the image processing device is used as the print server. However, the image processing device of the present invention is not limited to the same, and may carry out image processing while being provided at any of various types of intermediate servers, such as a file server or the like, connected on a network to the client terminals 14. Further, the present invention is not limited to use of the printer 18, and it is possible to connect a plate setter which directly exposes a presensitized plate or the like on the basis of image data in order to prepare a press plate for printing, or an exposure device which exposes an original film used for image printing (exposure) onto a presensitized plate, or the like.

Figure 2:
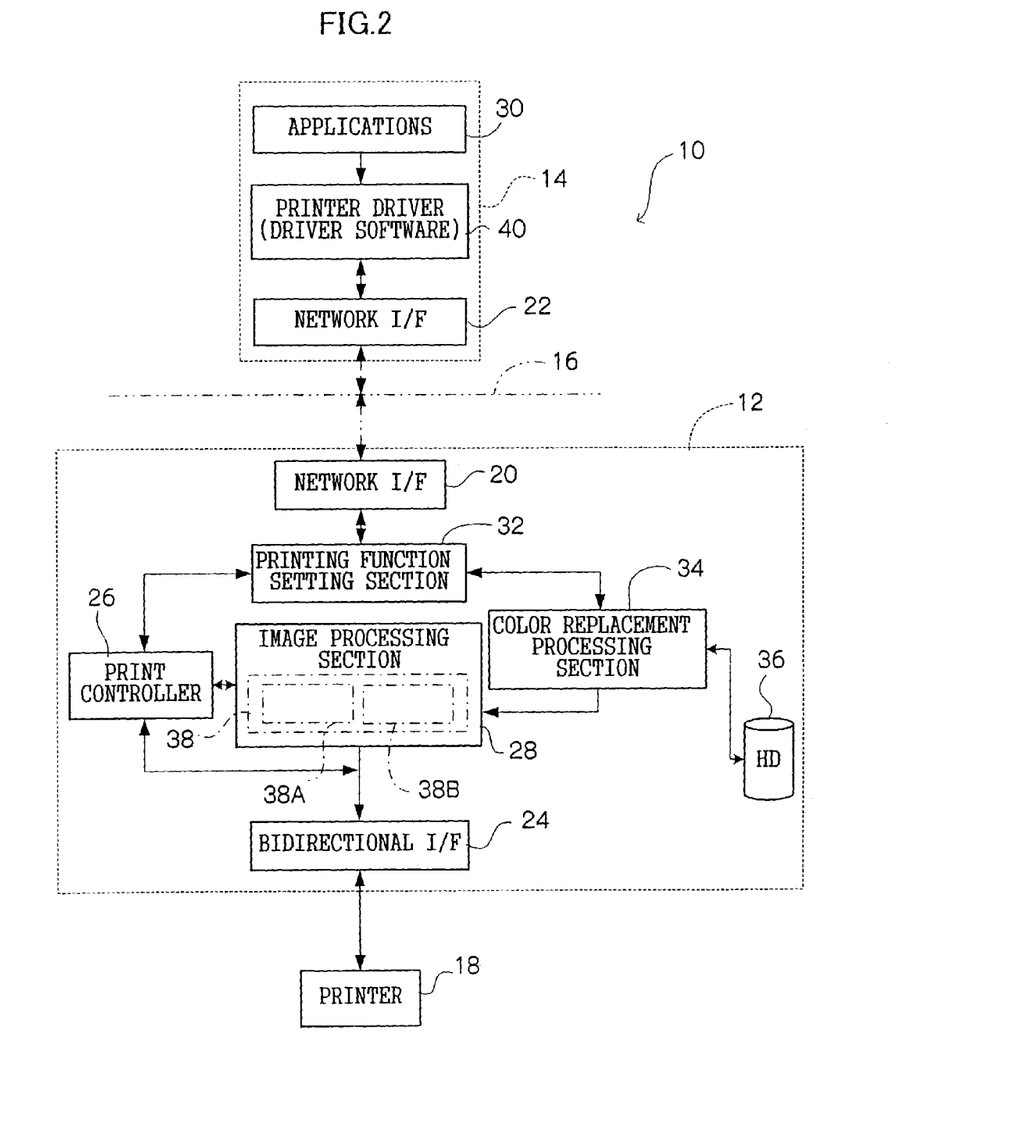
FIG. 2 is a block diagram showing the schematic structure of main portions of a print server and a client terminal applied to the embodiment.

As shown in FIG. 2, network interfaces (network I/Fs) 20, 22 are provided at the print server 12 and the client terminal 14. The print server 12 and the client terminal 14 are connected to the communication line 16 via these network I/Fs 20, 22. Further, the print server 12 is provided with a bidirectional interface (bidirectional I/F) 24 such as an Ethernet (R), and is connected to the printer 18 via the bidirectional I/F 24. There may be a plurality of the printers 18 connected to the print server 12, and a plurality of bidirectional I/Fs 24 or a plurality of types of bidirectional I/Fs 24 may be used.

A LAN (local area network) connection, such as Apple Talk, Ethernet (R) (e.g., Ethernet (R) Talk), or the like, may be used as the network connection between the plural client terminals 14 and the print server 12, or a WAN (wide area network) connection may be used. Namely, connection in accordance with an arbitrary network protocol can be used.

The print server 12 can be structured by, for example, adding a PCI board equipped with predetermined functions to a personal computer (PC). Or, the print server 12 may be provided with an input device such as a keyboard, a mouse or the like, and a display device such as a CRT display, an LCD display or the like, and with a WYSIWYG function which processes an image displayed on the display device and prints-out the displayed image.

A print controller 26, which controls the printer 18, and an image processing section 28 are provided at the print server 12. The image processing section 28 carries out RIP processing which generates raster data on the basis of job data such as drawing data or image data inputted as a print job from the client terminal 14.

At the print server 12, the inputted print job is stored in a processing queue (queue buffer). The print job stored in the processing queue is read-out in order, and image processing (RIP processing) is carried out. The data, which has been subjected to image processing and is to be outputted to the printer 18 (the raster data), is stored in a printing queue, and is outputted in order to the printer 18 from the printing queue. Further, the print server 12 has the usual structure in which jobs for which printing processing has not been designated and jobs for which printing processing cannot be executed are stored and held in a holding queue. Note that the print server 12 can utilize any of various, conventionally known structures, and detailed description thereof will be omitted in the present embodiment.

The client terminal 14 is equipped with various types of applications 30. By using the applications 30, the client terminal 14 can carry out document preparation, and image processings such as creation, manipulation, editing and the like of images and documents, and the like, and can prepare printing data for press plate printing. Further, the client terminal 14 can transmit to the print server 12, prepared image data or drawing data and various types of processing instructions as a print job.

When the printer server 12 receives the print job, the print server 12 carries out the designated image processings on the print job, and outputs it to the printer 18. A printed matter corresponding to the print job is thereby obtained.

A printing function setting section 32 is provided at the print server 12. When the print server 12 receives a job such as a print job or the like, the printing function setting section 32 carries out setting of the various types of printing functions designated by the print job. In the print server 12, conventionally known printing functions can be set. The printing function setting section 32 judges the printing functions designated by the print job and carries out settings such that the respective printing functions are executed at the image processing section 28 and the printer controller 26. Detailed description thereof is omitted in the present embodiment.

A color replacement processing section 34 is provided at the print server 12. When color replacement and a replacement color is set, the color replacement processing section 34 carries out color replacement on the basis of the settings on drawing objects, such as images, characters, or the like.

Further, an HD 36 serving as a storing means is provided at the print server 12. At the print server 12, in addition to the process colors of cyan, magenta, yellow and black, a plurality of spot colors are set in advance. CMYK values for each of the set spot colors are stored in table form in the HD 26.

When a designation is given to replace any of the process colors with a spot color, the color replacement processing section 34 refers to the CMYK values of the look-up table (LUT) stored in the HD 36, and sets the CMYK values so as to update the color information. Namely, by composing the CMYK values of the spot color with the CMYK values of a color other than the color for which color replacement has been designated, color information of new CMYK values is generated.

In this way, for example, when preparing image data or document data for two-color printing by using any two colors among the process colors, one color or two colors thereof can be printed-out by using a spot color which is different from the process colors. Namely, when printing-out by using a press plate, simulation of a case in which printing processing is carried out using an ink that is different from a process color is possible.

A region 38A for CMYK output and a region 38B for CMYK color correction are provided in a memory 38, which is shown by the one-dot chain line, in the image processing section 28. At the image processing section 28, when image processing is carried out on the image which is the object of the print job (i.e., the image object), the CMYK values of the spot color are stored in the region 38A for CMYK output. Further, the CMYK values of the process color used in this image object are stored in the region 38B for CMYK color correction. After color correction is carried out on the CMYK values stored in the region 38B for CMYK color correction, the corrected CMYK values are composed with the CMYK values stored in the region 38A for CMYK output. In this way, color information of this drawing object is generated and outputted.

In this way, at the image processing section 28, even when an N-color printing simulation is carried out by using a spot color, it is possible to carry out color correction on CMYK values which have not been subjected to color replacement.

Driver software 40 (a printer driver), which is for setting the various types of printing functions provided at the print server 12, is built-in into each of the client terminals 14. At the client terminal 14, when a request for printing processing or the like of the drawing command or the image data prepared by the applications 30 is carried out, settings of the various printing functions provided at the print server 12 can be carried out by using the driver software 40.

At the driver software 40, it is possible to set the N-color printing simulation which is provided as a function of the print server 12.

Figure 3A:
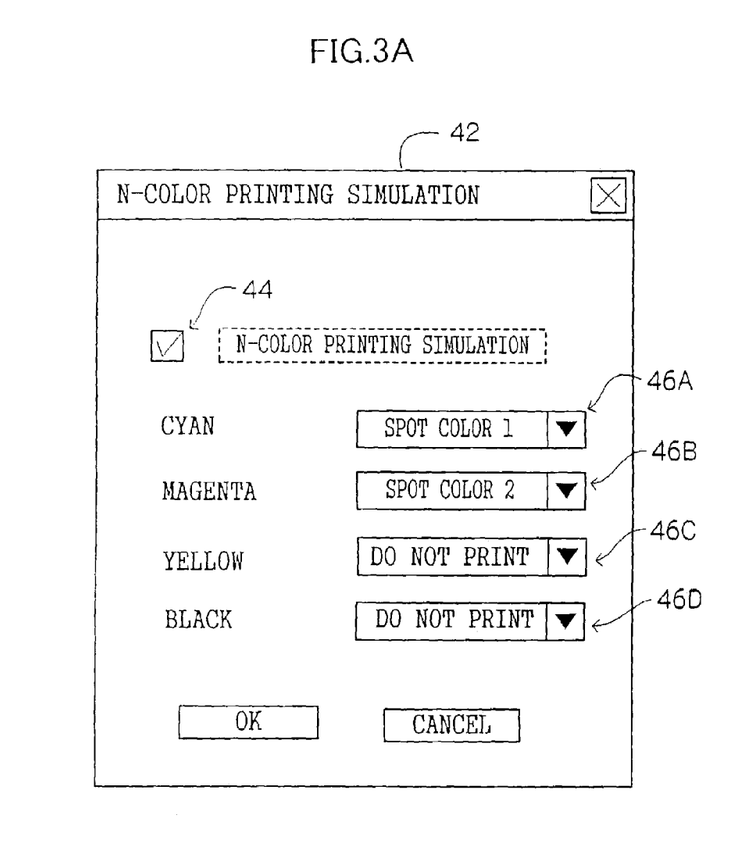
FIGS. 3A and 3B are schematic structural diagrams of setting dialog boxes showing examples of user interfaces.

FIG. 3A shows an example of a setting dialog box 42 which is displayed as a user interface displayed on an unillustrated monitor of the client terminal 14 by the driver software 40. In this setting dialog box 42, by checking a check box 44, it is possible to designate whether or not N-color printing simulation is to be carried out. Namely, setting of from one-color printing simulation (N=1) to four-color printing simulation (N=4) is possible.

When N-color printing simulation is to be carried out, for each of the process colors of cyan, magenta, yellow and black, a designation as to whether or not printing-out is to be carried out and a designation of the replacement color when printing-out is to be carried out can be selected by using the combo boxes 46A, 46B, 46C, 46D.

In the combo boxes 46A through 46D, a list of the process colors of CMYK and the respective spot colors set at the print server 12 are displayed by a pull-down menu. For each of the colors, it is possible to designate that the color is not to be printed-out or to designate the color from the colors in the list when the color is to be printed-out. Here, by designating any of the colors, color replacement is carried out at the print server 12 so that the corresponding color is printed-out.

Further, the designation of the color (the replacement color) does not have to be made by the name of the spot color, and may be made by inputting a character string expressing the CMYK values. For example, the designation can be received in a form such as "=C10M20Y30K40". In this case, the color is replaced by a color which is 10% cyan, 20% magenta, 30% yellow, and 40% black.

Note that the setting dialog box 42 shows an example of carrying out designations such that the colors of cyan and magenta are replaced by spot color 1 and spot color 2 which are set in advance, and two-color printing is carried out.

Figure 3B:
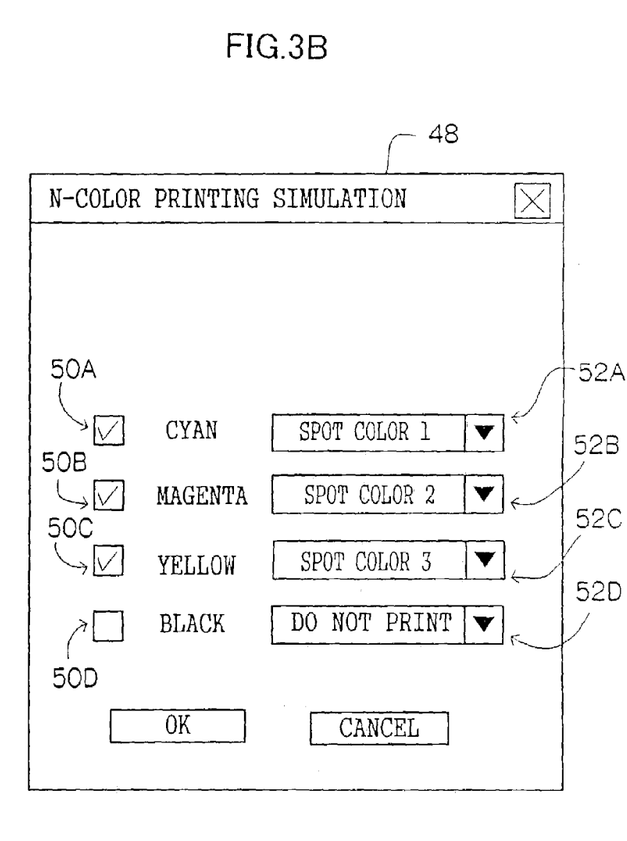

As the user interface, for example, the setting dialog box 48 shown in FIG. 3B can be used. In this setting dialog box 48, the designation of N-color printing simulation is omitted. For the respective process colors, check boxes 50A, 50B, 50C, 50D for setting whether or not printing-out is to be carried out, and combo boxes 52A, 52B, 52C, 52D for designating the replacement colors, are provided. Note that the setting dialog box 48 shows an example in which setting is carried out such that cyan is replaced by spot color 1, magenta is replaced by spot color 2, and yellow is replaced by spot color 3, and three-color printing simulation is carried out.

The user interface may be used for designation not only at the client terminal 14, but also at the print sever 12. In this case, a print job transmitted from the client terminal 14 can be selected, and a user interface such as the setting dialog boxes 42, 48 or the like can be displayed on an unillustrated monitor.

Here, explanation will be given of a summary of the processings at the time of carrying out N-color printing simulation by the print server 12 and the client terminal 14 which are structured in this way. Note that, at the print server 12, it is possible to carry out processing for composite output for outputting to the printer 18, and composing processing of separation output for preparing a press plate for printing. First, the processing for composite output will be described.

The image processing device such as the print server 12 or the like generally has a structure which is provided with a color management system (CMS) which converts the CMYK values of the drawing object into new CMYK values. When processing for composite output is carried out, this CMS can be used.

Here, as an example, description will be given of a case in which color replacement is carried out by using the color management system provided at the print server 12.

In the network 10, at the client terminal 14, the drawing command or the image data, which has been subjected to processings such as creation, manipulation, editing, and the like by using the applications 30, is outputted to the print server 12 as a print job. At this time, N-color printing simulation can be designated at the client terminal 14 by using the driver software 40. Further, when N-color printing simulation is to be carried out, designation of the replacement colors is also carried out. Note that, in the setting dialog box 42, it is also possible to designate color replacement between process colors, such as replacement from cyan to magenta or the like.

When the print server 12 receives the job outputted from the client terminal 14 and the job is a print job, reading and setting of the printing functions is carried out at the printing function setting section 32. At the image processing section 28, RIP processing, which prepares raster data from the drawing command or the image data of the print job, is carried out.

The raster data generated at the image processing section 28 is outputted to the printer 18 at a predetermined time. In this way, the printer 18 carries out printing-out which is based on the drawing command or the image data of the print job.

At the print server 12, by designating N-color printing simulation, color replacement is carried out so as to replace the respective process colors of CMYK with designated colors.

Figure 4A:
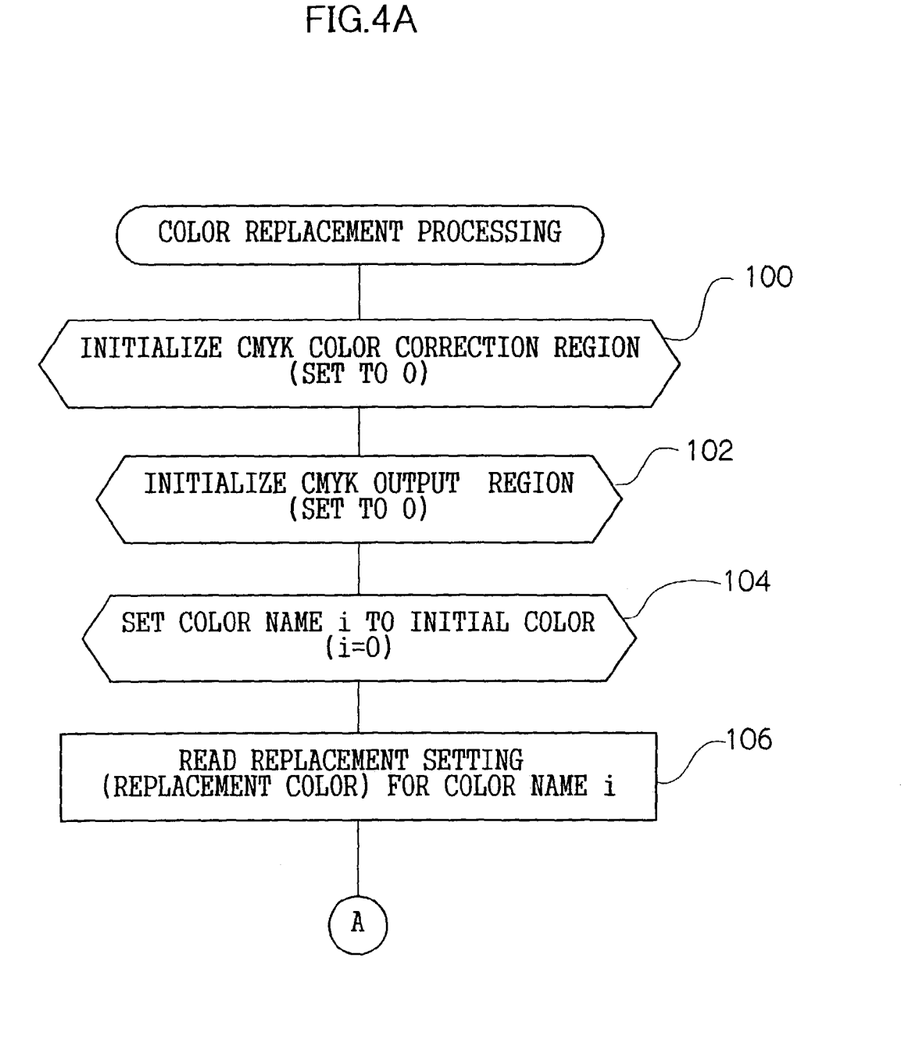
FIGS. 4A and 4B are flowcharts showing basic processes of color conversion for composite output.
Figure 4B:
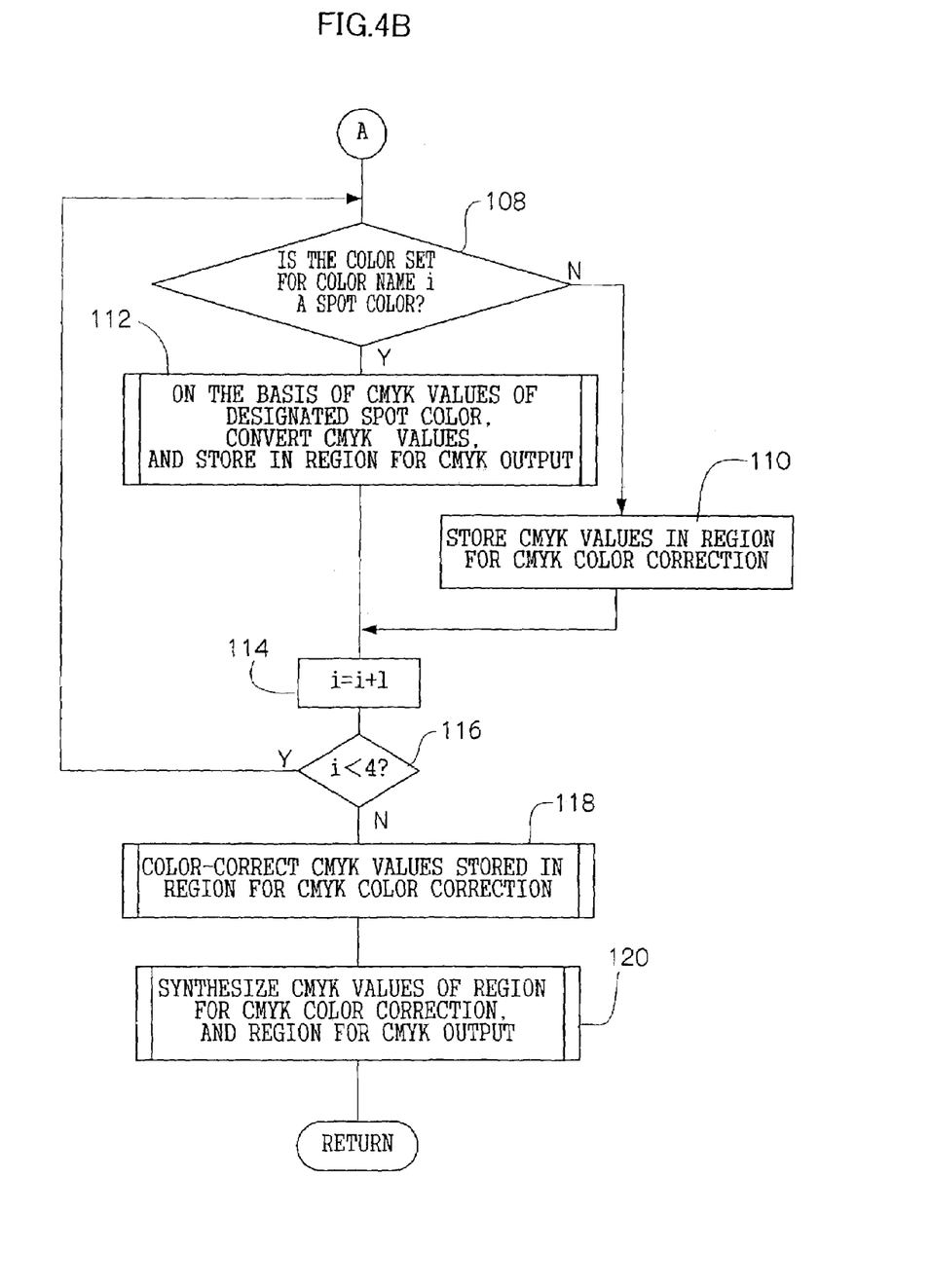

FIGS. 4A and 4B show an example of the processes of color replacement. Here, in order to simplify explanation, color replacement is carried out in pixel units of the drawing object, and CMYK values are stored in pixel units in the region 38A for CMYK output and the region 38B for CMYK color correction.

This flowchart is a sequence executed when N-color printing is designated. First, in the sequence, in step 100, the region 38B for CMYK color correction is initialized. In step 102, the region 38A for CMYK output is initialized. In step 104, a color variable i is set to an initial color (i=0). This color variable i represents the respective colors of CMYK. For example, i=0 is C, i=1 is M, i=2 is Y, and i=3 is K. Further, color name (i) expresses the color of the color variable i.

When initial settings are completed in this way, in step 106, the color replacement setting (replacement color) for the color of the color variable i is read.

Thereafter, in step 108, a determination is made as to whether the read replacement color is a spot color. At this time, if the replacement color is not a spot color and is a process color (any of CYMK), the determination in step 108 is negative. The routine moves on to step 110 where the CMYK values are stored in the region 38B for CMYK color correction.

On the other hand, when the replacement color is a spot color which is different from the process colors, the determination in step 108 is affirmative. The routine moves on to step 112 where the CMYK values of the spot color which is designated are read-out from the LUT stored in the HD 36, and conversion of the CMYK values is carried out. Namely, the CMYK values of the designated spot color are converted in accordance with the density or the like of this pixel.

The CMYK values obtained by conversion are stored in the region 38A for CMYK output.

Thereafter, in step 114, the color variable i is incremented (i=i+1). In subsequent step 116, it is confirmed whether conversion of the replacement colors for all of the colors has been completed, i.e., it is confirmed whether the color variable i has reached 4. If there are remaining colors (i.e., if i<4), the determination in step 116 is affirmative. The routine moves to step 108 and color replacement for the next color begins. Note that, for colors for which "do not print" has been designated, the CMYK values are not stored and the routine moves on to step 114.

In this way, when conversion to the replacement color is completed for all of the four colors and the determination in step 116 is negative, the routine moves on to step 118 where a predetermined color correction is carried out on the CMYK values stored in the region 38B for CMYK color correction. Note that this color correction utilizes a conventionally known method, and detailed description thereof is omitted.

When color correction of the CMYK values stored in the region 38B for CMYK color correction is completed, the routine moves on to step 120 where the CMYK values, which have been subjected to color correction, are composed with the CMYK values stored in the region 38A for CMYK output.

In this way of generating CMYK values, it is possible to carry out a conventionally known color correction on the colors of CMYK for which no spot color is designated. Thus, appropriate color correction is possible without affecting the spot colors.

Further, because color replacement is not carried out at the client terminal 14, the data management at the client terminal 14 is extremely simple.

By ensuring several pixels worth of the region 38A for CMYK output and the region 38B for CMYK color correction in the memory 38, it is possible to carry out batch color replacement processing of a region having a proper degree of surface area in the drawing object, rather than processing in units of one pixel.

For conversion into the CMYK values of the spot color, as shown in Table 1 for example, the L*a*b* values of 100% density of the spot color may be stored in the HD 36, and CMYK value conversion may be carried out by using these L*a*b* values.

TABLE 1

|  | L* value | a* value | b* value |
|---|---|---|---|
| spot color 1 | 42.89 | 74.25 | −25.19 |
| spot color 2 | 44.30 | 46.38 | −6.17 |
| ... | ... | ... | ... |
| spot color N | 59.75 | −15.09 | 0.95 |

Figure 5:
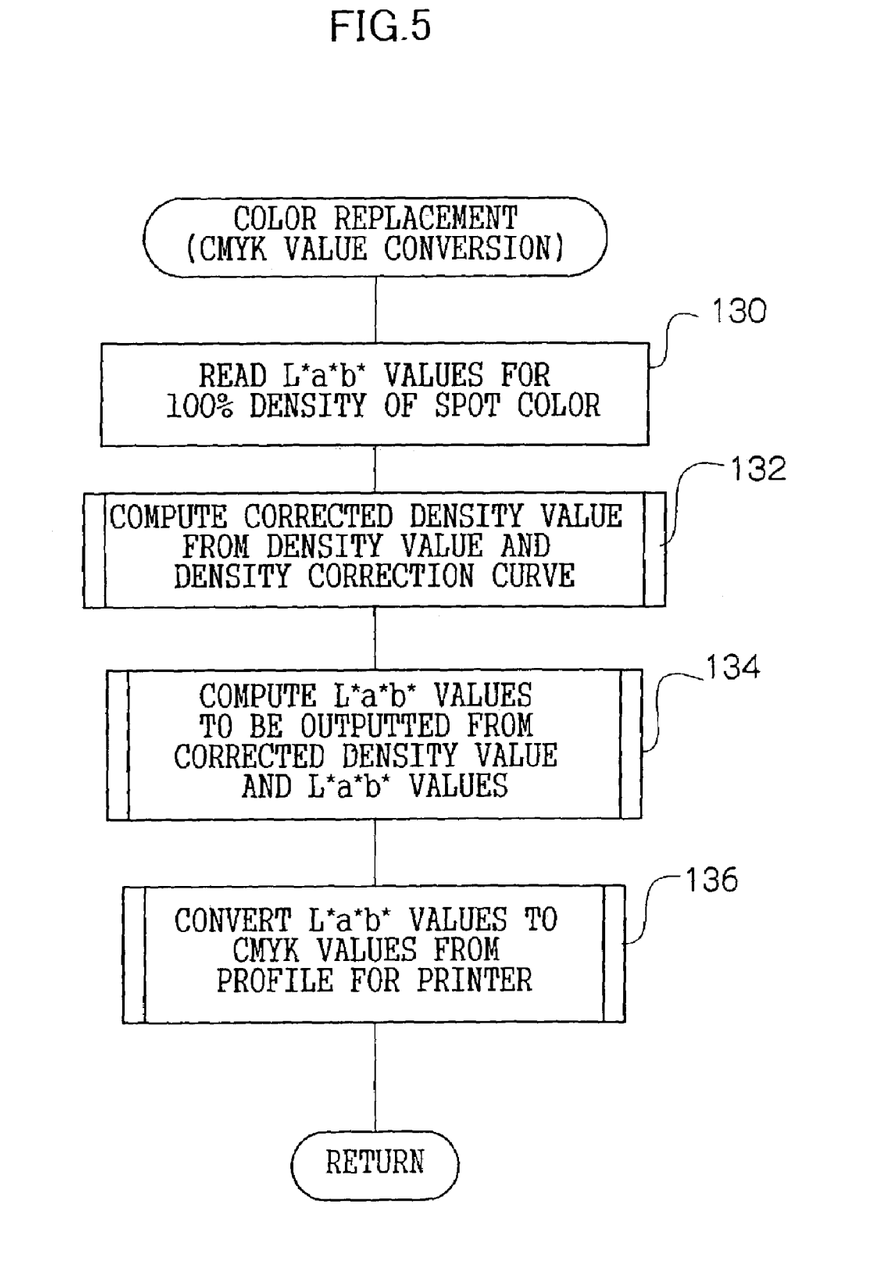
FIG. 5 is a flowchart showing basic processes of CMYK value conversion.

FIG. 5 shows a summary of the processes at the CMYK value conversion of step 112 of the flowchart in FIG. 4B, by using the LUT shown in Table 1.

In this flowchart, in initial step 130, the L*a*b* values for 100% density of the designated spot color are read from the LUT stored in the HD 36. In next step 132, the corrected density is computed from the density value of that pixel and a density correction curve.

Thereafter, in step 134, the L*a*b* values which are to be outputted are computed from the corrected density value and the L*a*b* values of the spot color. In step 136, a profile for the outputting printer (e.g., the printer 18) is used to convert the L*a*b* values into CMYK values, and the CMYK values obtained by conversion are stored in the region 38A for CMYK output.

Further, the conversion into the CMYK values of the spot color may be carried out by, as shown in Table 2 for example, computing the CMYK values for each of the spot colors, corresponding to the density levels of 0 to 255 thereof, and storing the CMYK values in the HD 36. The CMYK values may be read-out from the HD 36 in accordance with the density of the corresponding pixel.

TABLE 2

|     | cyan | magenta | yellow | black |
|-----|------|---------|--------|-------|
| 0   | 0    | 0       | 0      | 0     |
| 1   | 0    | 1       | 1      | 0     |
| ... | ...  | ...     | ...    | ...   |
| 255 | 122  | 255     | 100    | 100   |

In this way, when composite output is to be carried out, by executing the CMS during the conversion into raster data (rasterizing), replacement of the CMYK values (color replacement) can be executed for each drawing object. Further, in the case of composite output, by executing the CMS, color replacement can be carried out on the raster data which has been rasterized.

Next, separation output will be described. When separation output is to be carried out, the image data or the drawing data is separated into cyan, magenta, yellow and black and outputted. Thus, the CMS cannot be implemented during rasterizing. Therefore, the CMS is implemented on the raster data generated by rasterizing.

When separation output is to be carried out, the order in which the colors are outputted depends on the application. Thus, for example, the color name is judged from PostScript description.

Figure 6:
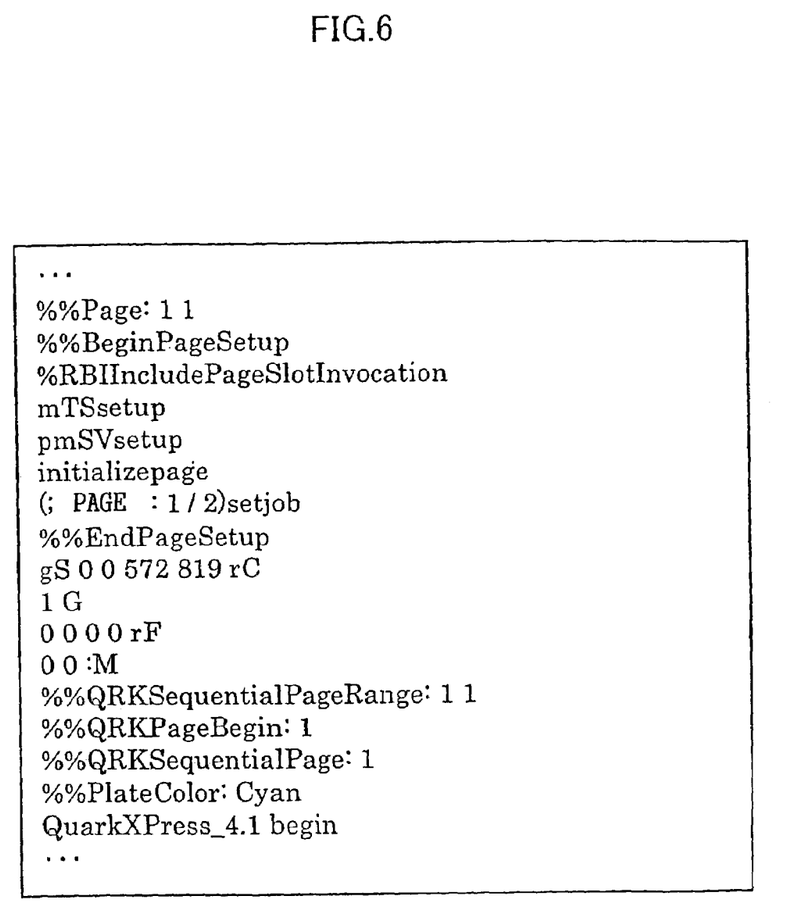
FIG. 6 is a schematic diagram showing an example of description in PostScript format at the time of carrying out separation output (divisional plate output).

Namely, as shown in FIG. 6, in the comment field in the PostScript description, there is description showing the color of the plate which is undergoing processing, such as "%%PlateColor:Cyan". By extracting this description, determination of the color can be carried out.

Figure 7A:
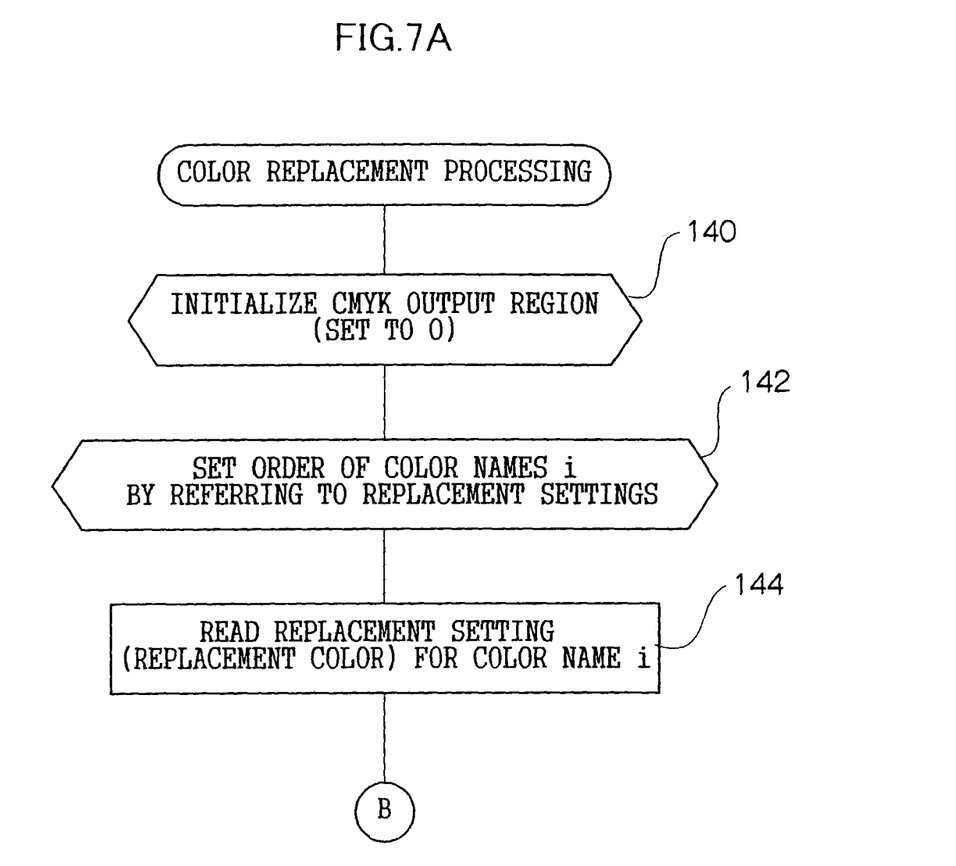
FIGS. 7A and 7B are flowcharts showing basic processes of color conversion for separation output.
Figure 7B:
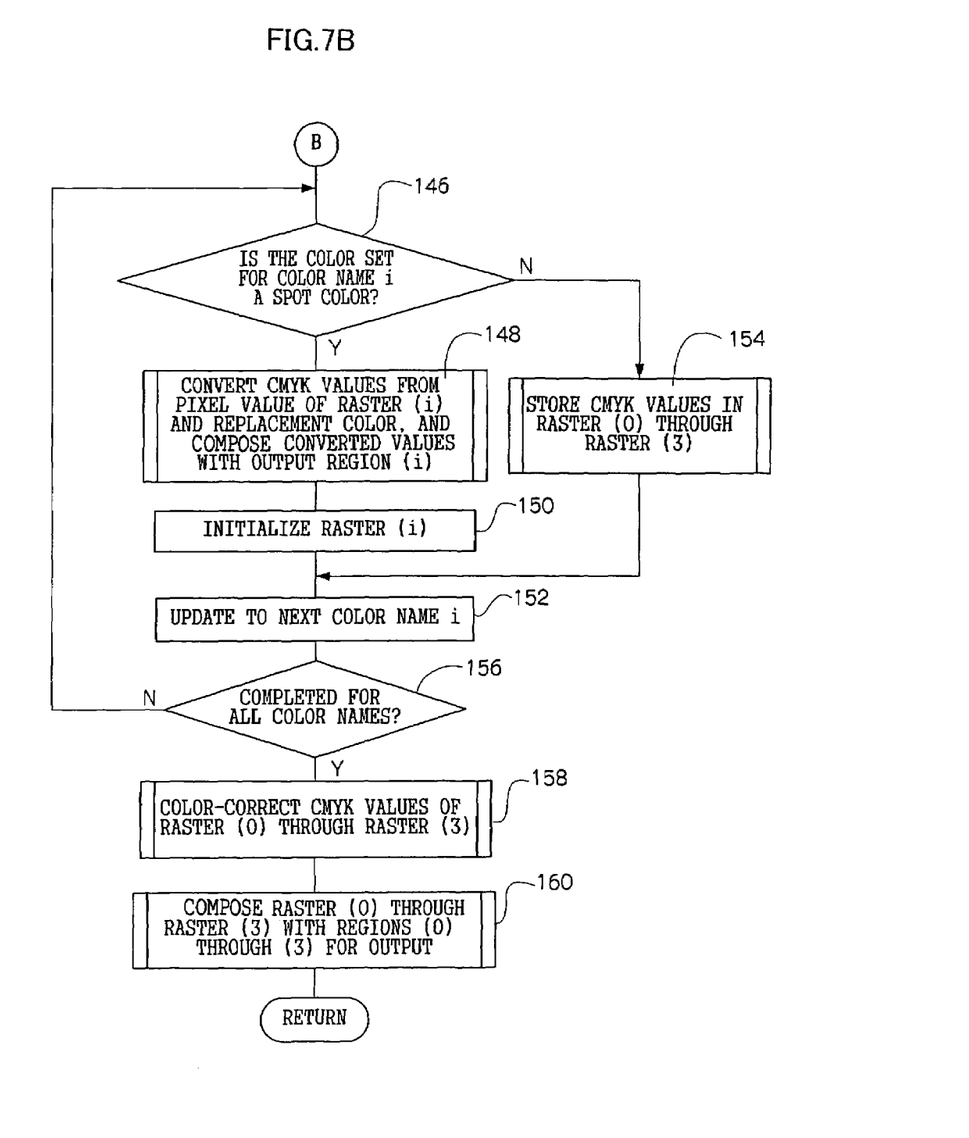

FIGS. 7A and 7B show a summary of color replacement at the time of carrying out composing separation output. Note that, in separation output, color replacement is carried out by using raster data. Thus, the flowchart in FIGS. 7A and 7B can be applied as well to cases in which processing for composite output is carried out. Further, in this flowchart, raster (i) represents the address of the raster data of the corresponding color, and region (i) for output represents the address at which the corresponding raster data is stored within the region 38A for CMYK output.

This flowchart is executed when rasterizing is completed. In initial step 140, the region 38A for CMYK output is initialized. In step 142, with reference to the replacement settings, the order of the color names i to be processed is set, and the color variable i is set to the first color. At this time, when color replacement is carried out from one process color to another process color, the replacement order is set such that this color replacement is carried out last. Note that, at the time of separation output, the region 38B for CMYK color correction is not used. Thus, this region can be allotted to the region 38A for CMYK output.

When the initial settings are completed in this way, in step 144, the color replacement setting (the replacement color) for the color name i is read.

Thereafter, in step 146, a determination is made as to whether the read replacement color is a spot color. When the replacement color is a spot color which is different from a process color, the determination in step 146 is affirmative, and the routine moves on to step 148. The CMYK values of the designated spot color are read from the LUT stored in the HD 36, and conversion of the CMYK values from the pixel value of the raster (i) is carried out. Namely, the CMYK values of the designated spot color are converted in accordance with the density or the like of the corresponding pixel.

The CMYK values obtained by conversion are composed with the output region (i) within the region 38A for CMYK output.

Thereafter, in step 150, the raster (i), for which color replacement has been carried out, is initialized. In step 152, the color name i is updated to the next color name i.

Further, when the color set for the color name i is not a spot color, the determination in step 146 is negative, and the routine moves on to step 154. Namely, when the replacement color is not a spot color and is set to any of the process colors, or when there is no designation of a replacement color, the routine moves on to step 154.

In step 154, the CMYK values of the set process color are stored in raster (0) through raster (3), and the routine moves on to step 156.

In step 156, it is confirmed whether conversion of the replacement colors for all of the colors (color names i) has been completed. If there is a remaining color, the determination in step 156 is negative, and the routine moves on to step 146 where color replacement for the next color is started. Note that, for colors for which "no printing" is designated, the routine moves from step 146 to step 150.

In this way, when conversion to the replacement color is completed for all four colors and the determination in step 156 is affirmative, the routine moves on to step 158 where color correction is carried out on the CMYK values of rasters (0) through (3). Namely, color correction is carried out on the process colors remaining in rasters (0) through (3).

Thereafter, in step 160, the rasters (0) through (3) are composed with the output regions (0) through (3), and raster data of each color is generated.

Namely, when separation output which divides the image data or the drawing data into the respective colors of CMYK is carried out, at the print server 12, the image data or the drawing data is rasterized at the image processing section 28, and raster data of the respective colors of C (cyan), M (magenta), Y (yellow) and K (black) are obtained. Usually, thereafter, color correction is carried out on the raster data of the respective colors.

In contrast, when color replacement with a spot color is carried out, the raster data of the corresponding color is converted into CMYK values of the spot color, and raster data of each color of CMYK is generated. Thereafter, by composing the corrected raster data of the respective colors of CMYK and the raster data corresponding to the CMYK values of the spot color, the raster data of the respective colors for separation output are formed in the region for output.

Figure 8A:
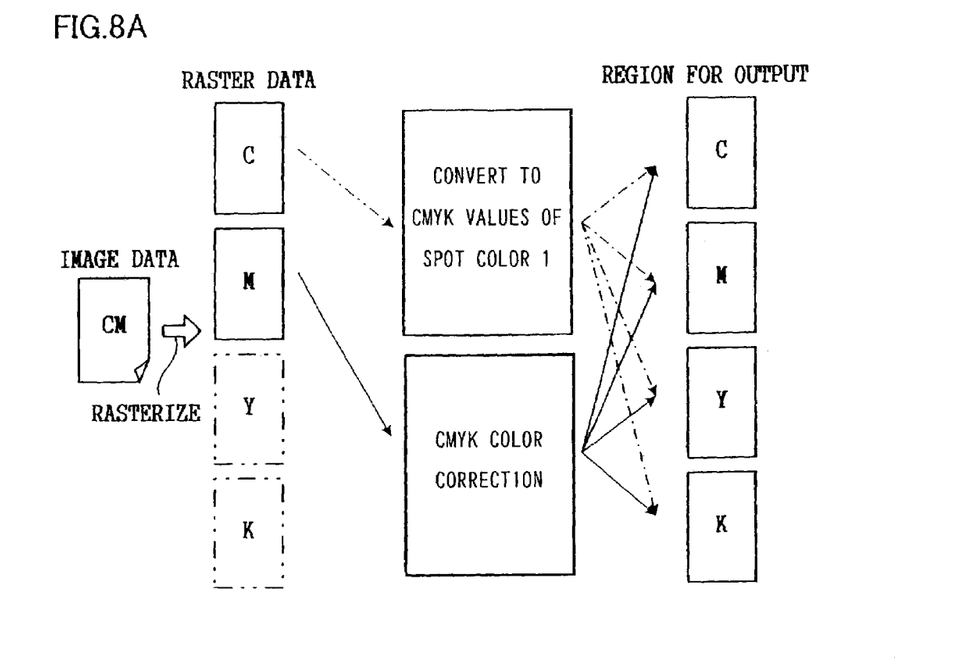
FIG. 8A shows a flow of processing at the time of carrying out a two-color printing simulation using, as an example, spot color 1 and M.

For example, as shown in FIG. 8A, for image data of the two colors of C (cyan) and M (magenta), when C is replaced by spot color 1, color correction is carried out on the M raster data. Further, for the C raster data, color replacement is carried out by conversion on the basis of the CMYK values of spot color 1, and the respective raster data of CMYK are generated.

Thereafter, by outputting raster data for each of the colors of CMYK, printing output for the two-color printing of M and spot color 1 can be obtained.

Figure 8B:
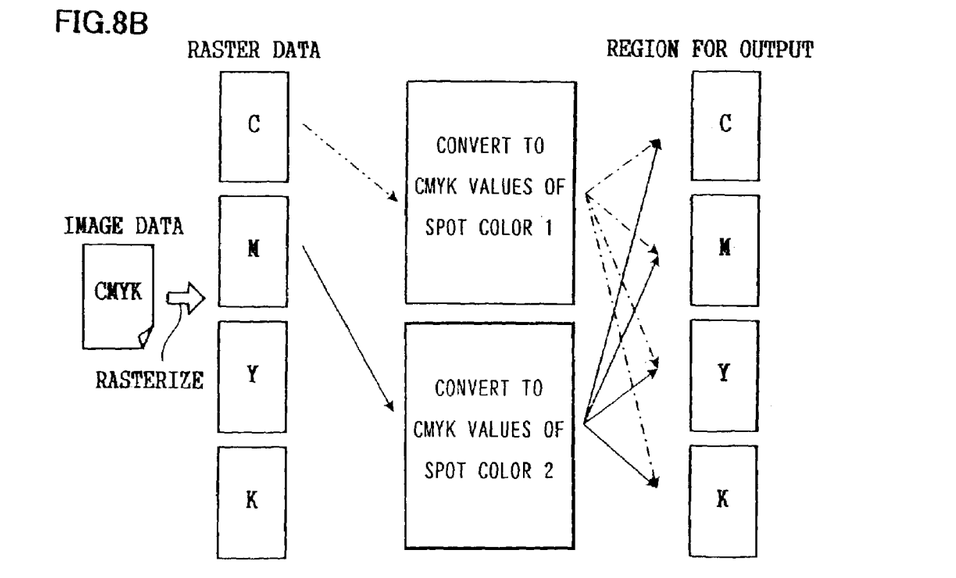
FIG. 8B shows a flow of processing at the time of carrying out a two-color printing simulation using, as an example, spot color 1 and spot color 2.

Alternatively, as shown in FIG. 8B, for image data of colors C and M, when C is designated to be replaced with spot color 1 and M is designated to be replaced with spot color 2, color conversion for the C raster data is carried out on the basis of CMYK values of spot color 1 to generate the respective raster data of CMYK. Further, for the M raster data, color conversion is carried out on the basis of CMYK values of spot color 2 to generate the respective raster data of CMYK.

By composing and outputting raster data of each color of CMYK for these colors, printing output for the two-color printing of spot color 1 and spot color 2 can be obtained.

In this way, by generating raster data for each of the colors of CMYK, conventionally-known color correction can be carried out on the respective colors of CMYK which are not designated to be replaced by a spot color. Thus, appropriate color correction is possible without affecting the spot colors.

Further, even when a plurality of spot colors are designated, raster data of CMYK on the basis of designated spot colors are easily generated.

Further, because color replacement is not carried out at the client terminal 14, data management at the client terminal 14 is extremely simple.

Note that the above-described embodiment is not intended to limit the structure of the present invention. For example, in the present embodiment, explanation is given of a case in which N-color printing simulation is carried out in units of jobs. However, when there are a plurality of pages of image data or drawing data, color separation may be carried out in units of pages.

Further, in the present embodiment, explanation is given of processing on image data or drawing data which is inputted to the print server 12 from the client terminal 14 as a print job. However, the present invention is not limited to the same, and generation of data for N-color printing or data for N-color printing simulation may be carried out at the print server 12 or an intermediate server or the like.

Further, in the present embodiment, description is given of a case in which the present invention is applied to the print server 12 of the network 10. However, the present invention is not limited to the same, and may be applied to an image processing device of an arbitrary structure connected to a network.

As described above, in accordance with the present invention, when color replacement of color information with a stored replacement color is set, the color information of the designated process color is replaced by color information of the replacement color, and is composed with color information of another color. Thus, the various types of information included in the original image data or drawing data are not adversely affected. Further, various types of color correction can be carried out on process colors for which color replacement is not set. Accordingly, an excellent effect can be achieved in that print-out of a desired color can be obtained by the simple operation of setting the color which is the object of replacement and the replacement color.

What is claimed is:

1. An image processing device, comprising:
   a receiving section that receives a print job including at least one of image data and drawing data to be printed;
   a storing section that stores a CMYK value of a spot color;
   a detecting section that detects whether a process color included in at least one of the image data and the drawing data is a first process color being designated to be replaced by a spot color or a second process color not being designated to be replaced by a spot color;
   a replacing section that replaces a CMYK value of the first processing color with the CMYK value of the spot color stored in the storing section when the detecting section detects that the process color included in at least one of the image data and the drawing data is the first process color;
   a color correcting section that carries out color correction of a CMYK value of the second process color when the detecting section detects that the process color included in at least one of the image data and the drawing data is the second process color; and
   a generating section that generates a composed CMYK value by composing the CMYK value of the spot color replaced by the replacing section and the CMYK value of the second process color to which the color correction is carried out by the color correcting section.

2. The image processing device according to claim 1, wherein
   the detecting section detects whether the process color is the first process color or the second process color in units of one pixel of an image,
   the replacing section that replaces the CMYK value of the first process color with the CMYK value of the spot color in units of one pixel,
   the color correcting section carries out the color correction in units of one pixel, and
   the generating section generates the composed CMYK value in units of one pixel.

3. The image processing device according to claim 1, further comprising an output section that outputs the composed CMYK value to a printer.

4. The image processing device according to claim 1, wherein the receiving section receives the print job from a client terminal through a network.

5. An image processing method, comprising:
   receiving a print job including at least one of image data and drawing data to be printed;
   storing a CMYK value of a spot color;
   detecting whether a process color included in at least one of the image data and the drawing data is a first process color being designated to be replaced by a spot color or a second process color not being designated to be replaced by a spot color;
   replacing a CMYK value of the first processing color with the CMYK value of the spot color stored in the storing section when the detecting detects that the process color included in at least one of the image data and the drawing data is the first process color;
   correcting a CMYK value of the second process color when the process color included in at least one of the image data and the drawing data is the second process color; and
   generating a composed CMYK value by composing the CMYK value of the spot color and the CMYK value of the second process color which is color corrected.

6. The image processing method according to claim 5, wherein
   detecting whether the process color is the first process color or the second process color in units of one pixel of an image,
   replacing the CMYK value of the first process color with the CMYK value of the spot color in units of one pixel,
   correcting in units of one pixel, and
   generating the composed CMYK value in units of one pixel.

7. The image processing method according to claim 5, further comprising outputting the composed CMYK value to a printer.

8. The image processing method according to claim 5, wherein receiving the print job is from a client terminal through a network.

* * * * *

UNITED STATES PATENT AND TRADEMARK OFFICE
CERTIFICATE OF CORRECTION

| | |
|---|---|
| PATENT NO. | : 7,426,060 B2 |
| APPLICATION NO. | : 10/390718 |
| DATED | : September 16, 2008 |
| INVENTOR(S) | : Yasushi Nishide, Ryuichi Ishizuka and Mari Kodama |

It is certified that error appears in the above-identified patent and that said Letters Patent is hereby corrected as shown below:

ON THE COVER PAGE:

Please add the second priority document as follows:

(30) Foreign Application Priority Data

Mar. 19, 2002   (JP)  ............................. 2002-076856
  --Mar. 17, 2003   (JP)  ............................. 2003-071484--

Signed and Sealed this

Ninth Day of December, 2008

JON W. DUDAS
*Director of the United States Patent and Trademark Office*